United States Patent
Blount

(10) Patent No.: US 6,495,655 B2
(45) Date of Patent: Dec. 17, 2002

(54) PRODUCTION OF AMINO-ALDEHYDE-PHOSPHATE RESINS AND COPOLYMERS

(76) Inventor: David H. Blount, 6728 Del Cerro Blvd., San Diego, CA (US) 92120

( * ) Notice: Subject to any disclaimer, the term of this patent is extended or adjusted under 35 U.S.C. 154(b) by 0 days.

(21) Appl. No.: 10/066,241

(22) Filed: Feb. 5, 2002

(65) Prior Publication Data

US 2002/0158237 A1 Oct. 31, 2002

Related U.S. Application Data

(60) Continuation-in-part of application No. 09/648,422, filed on Aug. 28, 2000, which is a continuation-in-part of application No. 09/149,847, filed on Sep. 8, 1998, now Pat. No. 6,258,298, which is a division of application No. 08/723,779, filed on Sep. 30, 1996, now Pat. No. 5,854,309.

(51) Int. Cl.[7] .................. C08G 79/02; C08G 79/04; C08G 12/36; C08G 12/38; C08G 12/28; C09K 21/10

(52) U.S. Cl. .................. 528/244; 528/248; 528/254; 528/256; 528/257; 252/609; 252/608; 252/607

(58) Field of Search .................. 252/609, 608, 252/607; 528/230, 242, 243, 244, 248, 252, 254, 256, 257, 266

(56) References Cited

U.S. PATENT DOCUMENTS

| | | | | | |
|---|---|---|---|---|---|
| 2,244,184 | A | * | 6/1941 | Austin et al. | |
| 4,284,759 | A | * | 8/1981 | Henbest et al. | 528/261 |
| 4,843,126 | A | * | 6/1989 | Quinn | 525/162 |
| 4,968,772 | A | * | 11/1990 | Whiteside | 528/230 |
| 5,010,113 | A | * | 4/1991 | Blount | 521/107 |
| 5,089,559 | A | * | 2/1992 | Blount | 525/107 |
| 5,115,083 | A | * | 5/1992 | Piedrahita et al. | 528/230 |
| 5,854,309 | A | * | 12/1998 | Blount | 523/179 |
| 5,933,817 | A | * | 8/1999 | Hucal | 705/39 |
| 6,054,515 | A | * | 4/2000 | Blount | 524/118 |
| 6,270,694 | B1 | * | 8/2001 | Blount | 252/607 |
| 6,348,526 | B1 | * | 2/2002 | Blount | 524/100 |

* cited by examiner

Primary Examiner—Joseph D. Anthony

(57) ABSTRACT

The amino-aldehyde-phosphate resins and copolymers are produced by reacting an amino compound, an aldehyde and a phosphorus oxyacid, These components may be reacted at ambient or elevated temperature or at ambient, elevated or reduced pressure. They may be produced in the form of water based pre-polymer, a clear resin or as granules or powder. These resins are flame retardant and may be added to or applied on to flammable organic materials to make them flame retardant. The amino-aldehyde-phosphate resins and copolymers may be utilized as coating agent, as an adhesive, films, laminates and as flame retardant compounds.

7 Claims, No Drawings

PRODUCTION OF AMINO-ALDEHYDE-PHOSPHATE RESINS AND COPOLYMERS

This application is a continuation in part of patent application Ser. No. 09/648,422 filed Aug. 28, 2000 which is a continuation in part of patent application Ser. No. 09/149,847 filed Sep. 8, 1998, now U.S. Pat. No. 6,258,298, which is a division of patent application Ser. No. 08/723,779, filed Sep. 30, 1996, now U.S. Pat. No. 5,854,309.

FIELD

The invention concerns amino-aldehyde-phosphate resins and copolymer and compositions. The invention also concerns their preparation and use. These amino-aldehyde-phosphate resin and copolymers are useful to produce flame retardant resins for use as plastic sheet, molding resins, coating agents, adhesive, casting resins, flame retardant lamates, binder and flame retardant powders.

BACKGROUND

Aminoplasts have been produced for many years, but the production of amino-aldehyde-phosphate resins and copolymers are novel. The production of clear amino-aldehyde-phosphate resins are novel. The aminoplasts are white and must be cured under heat and pressure whereas the amino-aldehyde-phosphates may be produced as a water based, self cured clear, tough, rigid or flexible resinous film which is flame retarded. Whiteside (U.S. Pat. No. 4,968,772) and Austin et al (U.S. Pat. No. 2,244,184) utilized an acid catalyst such as phosphoric acid but they utilized only a sufficient amount to adjust the pH. Whiteside utilized only about 1-2% phosphoric acid in the production of his aminoplast, percentage based on the weight of the aminoplast. This invention utilizes about 20 to 40 percent phosphorus oxyacid based on the weight of the amino-aldehyde-phosphate resin or copolymer.

What is lacking and what is needed are useful, safe and inexpensive flame retardant amino-aldehyde-phosphate resin. What is additionally lacking are amino-aldehyde-phosphate copolymers which are water based and upon drying forms a self cured clear, tough, rigid or flexible resinous film which is flame retarded. What is lacking and what is needed are useful, safe and inexpensive flame retardant amino-aldehyde-phosphate resinous powders and compositions for use as flame retardant in plastics and natural products.

SUMMARY

In one aspect, the invention comprises of the flame retardant amino-aldehyde-phosphate resin. Another aspect of the invention is the amino-aldehyde-phosphate copolymers and compositions. Another aspect of the invention is a process to prepare an amino-aldehyde-phosphate resin by mixing, selectively heating, and reacting the following components at ambient or elevated temperature and at ambient or lowered pressure and in a molar ratio of amino:aldehyde:phosphorus oxyacid of 1-2;1-2:0.5-1:
A) amino compound
B) aldehyde
C) phosphorus oxyacid
F) water, 0 to 200 percent by weight, percentage based on weight of amino compound; under conditions sufficient to prepare the amino-aldehyde phosphate resin. The components may be mixed in any suitable manner at ambient pressure, they may be mixed simultaneous or the amino compound and aldehyde may be mixed and heated to 50–75 degree C., then phosphorus oxyacid is added and reacted to produce a resinous powder or the phosphorus oxyacid is mixed and reacted with the amino compound or aldehyde compound, then the components are mixed together and reacted to produce an amino-aldehyde-phosphate resin. The components may be heat to just below the boiling point of the components when necessary to speed up the reaction and cure the resin. When excess water is present the mixture may be heated under reduced pressure to remove the excess water. The resin may be produced at ambient temperature and pressure.

In another aspect of the invention is a process to prepare the amino-aldehyde-phosphate copolymers, comprising mixing, heating and reacting the following compounds at ambient or elevated temperature and at ambient or reduced pressure and in a ratio of amino+organic compound:aldehyde: phosphorus oxyacid of 1-2:1-2:0.5-1:
A) Amino compound
B) Aldehyde
C) phosphorus oxyacid
D) organic compound that will react with amino compound, aldehyde and/or phosphorus oxyacid, in the amount of 0 to 100 percent, percentage based on the weight of amino compound;
F) water, in the amount of 0 to 200 percent by weight, percentage based on weight of the amino compound;
under conditions sufficient to prepare the amino-aldehyde-phosphate copolymer. Phosphorus oxyacid is mixed and/or reacted with the amino compound and/or aldehyde and/or the organic compound (component D), the components are mixed at ambient or elevated temperature, at ambient or reduced or elevated pressure, and reacted.

In another aspect of the invention is a process to prepare the amino-aldehyde-phosphate resin, comprising of mixing, heating and reacting:
A) amino compound
B) Aldehyde
C) phosphorus oxyacid
E) filler, in the amount of 0 to 200 percent, percentage based on weight of amino compound;
F) water, in the amount of 0 to 200 percent, percentage based on weight of amino compound;
under conditions sufficient to prepare the amino-aldehyde-phosphate. The phosphorus oxyacid is mixed and/or reacted with the amino compound and/or aldehyde then the components are mixed and components A, B and C are reacted.

Another aspect of this invention is to produce a flame retardant compostion by apply the amino-aldehyde-phosphate resin and/or amino-aldehyde-phosphate copolymer and/or amino-aldehyde-phosphate composition into or on a flammable organic material.

COMPONENT A

Any suitable amino compound and its salts with free —$NH_2$ radicals may be utilized that will react with an aldehyde. Suitable amino compounds, include, but not limited to, urea, partially hydrolyzed urea condensate, buiret, cyanuric acid, cyamelide, melamine, melamine cyanurate, dicyandiamide, guanidine, cyanoguanidine, aminoguanidine, urea-amino condensate such as urea-melamine condensate, urea-dicyandiamide condensate, urea-guanidine condensate, urea-aminoguanidine condensate, aminophosphates with free —$NH_2$ radicals such as triaminophosphates and diaminophosphates, aminoborates, urea-polyamine condensates, urea-polycarbolic acid condensates, urea-propylene oxide condensates, urea-polyalcohol condensates, urea condensate salt of phosphorus oxyacid with free —$NH_2$ radicals and mixtures thereof. Urea and urea condensates are the most preferred amino compound. Amino compounds are utilized in an amount to produce an amino: aldehyde:phosphate molar ratio of 1-2:1-2:0.5-1.

COMPONENT B

Suitable aldehydes include, but not limited to, formaldehyde, paraformaldehyde, acetoaldehyde, butyraldehyde, chloral, and other alkyl aldehydes, furfural, benzyl aldehyde acrolein aldehyde, and other aromatic aldehydes. The aldehyde is utilized in an amount to produce an amino:aldehyde:phosphate molar ratio of 1-2:1-2:0.5-1.

COMPONENT C

Suitable phosphorus oxyacid include, but not limited to, Suitable phosphorus compounds include, but not limited to, phosphoric acid, polyphosphoric acid, pyrophosphoric acid, triphosphoric acid, metaphosphoric acid, hydrophosphorous acid, phosphinic acid, phosphinous acid, phosphine oxide, phosphorus trihalides, phosphorus oxyhalides, phosphorus oxide, salts of phosphoric acid with free hydrogen radicals such as mono-metal dihydrogen phosphates, amino dihydrogen phosphate, amine dihydrogen phosphate and alkali metal dihydrogen phosphate, halogenated phosphate-phosphite and their halides, organic phosphonates, phosphites, phosphates and phosphonate esters and acids and mixtures thereof. Phosphoric acid is the preferred phosphorus oxyacid. The phosphorus oxyacid is utilized in an amount to produce an amino:aldehyde:phosphate molar ratio of 1-2;1-2:0.5-1.

COMPONENT D

Any suitable organic compound that will react with any of the components, amino compound, aldehyde and/or phosphorus oxyacid may be used in this invention such as, but not limited to, amines, polyamines, phenol compounds such as phenol, cresol, aminophenol, quinones, aniline, Bisphenol A and resorcinol, vinyl acetate, polyvinyl alcohol furfuryl alcohol, epoxy resins, polyepoxy compounds, polyamides, acetyl resins, acrylic acids, cellulose, carbohydrates, polyisocyanates, lignin, amines, alkylanolamines, polycarboxyl acid and anhydrides, epoxies, polyvinyl acetate, organic isocyanates, imides, amides, sulfamic acid, thiourea, epihalohydrin, thiophenol, ketones, alkyl carbonates, oils, fats, allyl alcohol, alkyl acrylic acids, polyester resins with free —OH or —COOH radicals, sucrose amine polyols, sucrose polyols and mixtures thereof. Phenol is the preferred organic compound. The organic compound is utilized in the amount of 0 to 100 percent, percentage based on the weight of the amino compound.

COMPONENT E

Any suitable filler maybe used in this invention such as, but not limited to, aminoplasts, amino salts of organic phosphates, phenol-aldehyde resin powder, powdered coke, graphite, graphite compounds, plastic powder, silicates, ceramics, silica, metal oxides, silicates, carbonate, sulphates, phosphate and borates, glass or hollow beads, wood flour, straw fibers, nut shells, ammonium sulfates, amino sulfates, china clay, glass fibers and mixtures thereof. The organic halide flame retardant compounds may also be added as fillers. The filler may be used in the amount of 0 to 200 percent, percentage based on the by weight of amino compounds.

COMPONENT F

Water may be utilized in the amount of 0 to 200 percent, percentage based on the weight of the amino compound. Aqueous formaldehyde contains 60–70% water and it is advisable to reduce some of the water from the amino-aldehyde phosphate resin. The water can be removed by heating the water based resin under reduced pressure. The water may be removed before the reaction is complete to have a concentration of 60–70% solids.

COMPONENT G

Any suitable basic or acid compound that will adjust the pH may be used in this invention. Inorganic or organic acid are suitable to lower the pH. Typical acids include trichloracetic, ammonium chloride, toluene-p-sulphonic, hydrochloric, sulfuric, sulphamic and phosphoric acids. Any suitable basic salt forming compound may be used to elevate the pH such as sodium hydroxide, potassium hydroxide, ammonium hydroxide, alkali metal carbonates and mixtures thereof. The basic or acid compound is used in the amount of 0 to 10 percent, percentage based on the weight of the amino compound.

COMPONENT H

Any suitable plastic resin composition or mixtures thereof and any suitable natural organic material maybe used in this invention and mixtures thereof. These materials may be in the form of a solid, cellular suspension, emulsion or solution. Suitable plastic resin include, but not limited to, vinyl dienes, vinyl-diene copolymers, polyesters, polyester resins, phenoplasts, aminoplasts, polyepoxy resins, polyurethanes, furans, polyamides, polyimides, polycarbonates, homopolymers of such olefins as ethylene, propylene, and butylene; block copolymers, consisting of optional combination of these olefins; polymers of vinyl compounds such as vinyl chloride, acrylonitrile, methyl acrylates, vinyl acetates and styrene; copolymers of the foregoing olefins with vinyl monomers, copolymers and terpolymers of the foregoing olefins, with diene compounds; polyesters such as polyethylene terephthalate, polyester resins; polyamides such as nylon; polycarbonates, polyoxymethylene, silicones, polyethers, thioplasts, polytetrafluoroethylene, polysulfones, vinyidienes, poly(vinyl acet compounds, cyclic unsaturated compounds, urethane-epoxy resins, polyimides, urethane silicates, cellulose nitrate rayon, regenerated cellulose film cellulose acetate, cellulose esters, cellulose ethers, cyanoethyl cellulose, chlorinated rubber and mixtures thereof.

Suitable natural products include but not limited to wood, cellulose, lignin-cellulose, paper, cotton, wool, linen, dammars, copols, other natural resins, rosins, lignin, natural rubber, natural proteins, e.g., soya bean protein, silk, glues, gelatin, etc.; modified cellulose and mixtures thereof. Natural organic material and plastics may be mixed together. The amino-aldehyde-phosphate resin, copolymer or composition may be applied on or in the more flammable material in the amount of 5–40 percent, percentage based on the weight of the amino-aldehyde-phosphate resin or copolymer or composition.

COMPONENT I

Any suitable metal-containing compound that will accelerate carbonization effect used in this invention increases the amount of carbonization residue after combustion, thereby enhancing the flame retardant effect and may be used in this invention. These compounds include, but not limited to, alkaline earth metal borates such as magnesium borate, calcium magnesium borate and the like, manganese borate, zinc borate, metal oxides of titanium oxide, tin oxide, nickel oxide, zinc oxide and the like, ferrocene, dimethylglyoxime copper, acetyl-acetonatocooper, hydroxyquinoline nickel and the like, zinc thiocarbamate compounds such as zinc dimethylthio-carbamate , zinc di-n-butyidithiocarbamate and the like, mercaptobenzothiazole zinc compounds such as mercaptobenzothiazole zinc and the like, salicyadehyde zinc compounds such as salicylaldehyde zinc and the like, metal hydroxides such as aluminum hydroxide, magnesium hydroxide, calcium magnesium hydroxide, zirconium hydroxide and the like and mixtures thereof. The most preferable compounds are selected from zinc oxide, zinc thiocarbamates, the mercaptobenzothiazole zinc compounds the salicyaldehyde zinc compounds, zinc borate and the alkaline earth metal borates. The are utilized in the amount of 0 to 30 percent, percentage based on the weight of the more flammable material.

COMPONENT J

Any suitable compound that will reflect heat compound such as titanium oxide may be used in this invention and used in the amount of 0 to 30 percent, percentage based on the weight of the flammable material.

Accordingly, this invention provides a process for the preparation of amino-aldehyde-phosphate resins and copolymers. The components, amino compounds, aldehyde and phosphorus oxyacid may be mixed in any suitable manner, such as adding the phosphorus oxyacid to aldehyde and mixing and/or reacting these components at ambient temperature and pressure or heating up to 50 to 75 degrees C. under elevated pressure, then slowly add the amino compound while agitating at ambient temperature and pressure. The mixture may become opalescent when formaldehyde is the aldehyde if urea is added to fast, but the solution become clear and remains clear when heated. The temperature may be elevated gradually up to about 90 degrees C. to speed up the polymer formation and reduce the extractable aldehyde such as formaldehyde, then the pressure may be reduces to remove excess water. It is preferred that the phosphorus oxyacid be added to both the amino compound and the aldehyde, then mixed and reacted at ambient temperature and pressure. It is preferred that the amino compound and part of the phosphorus oxyacid be placed in one container of a two component mixing machine and the aldehyde and part of the phosphorus oxyacid be place into another container of the mixing machine, then they are mixed together and reacted at ambient or elevated temperature. The phosphorus oxyacid may first be reacted with the amino compound then reacted with the aldehyde at ambient or elevated temperature and ambient pressure thereby producing a resin. An amino-aldehyde-phosphate may be produced as a pre-polymer then additional amino compound may be added to cure the resin.

The molar ratio of the components should be regulated in order for all the aldehyde be reacted with the amino compound and phosphorus oxyacid and the copolymer. The molar ratio of the copolymer and/or amino compound to aldehyde to phosphoric acid is 1-2:1-2.0.5-1.

The amino-aldehyde-phosphate resin produced by the process of this invention when aqueous formaldehyde, urea derivatives and phosphoric acid are used in a molar ratio of amino:formaldehyde: phosphoric oxyacid of about 1:2:0.5 produces a water based clear, tough, flexible resin. When less phosphoric acid is used the resin is less flexible and more brittle.

Other carbonization auxiliaries, carbonization accelerators heat shield materials and fillers may be added with the amino-aldehyde-phosphate resin or copolymer or compositions. Carbonization auxiliaries include phosphorus containing compounds, boron containing compounds, boron phosphate containing compounds, sulfur containing compounds that produce acidic components in the pyrolysis mixture and maybe added in an amount of 0–30 percent, percentage based on the weight of the flammable organic material.

The invention is illustrated by reference to the following examples in which all parts and percentages are by weight.

EXAMPLE 1

120 parts by weight of aqueous formaldehyde containing 37% formaldehyde and 20 parts by weight of aqueous phosphoric acid (75%) are mixed and partially reacted then 32 parts by weight of urea powder is slowly added while agitating, the reaction is exothermic, then poured into a mold. The resin slowly solidifies into a clear, somewhat flexible, tough resin. After 10 days the resin was flame tested using a 3" Bunsen burner flame and holding the flame against the lower edge of the vertical held resin for 10 minutes. The resin did not catch on fire but swelled and formed charred bubbles.

EXAMPLE 2

Example 1 is modified by adding additional 10 parts by weight of urea powder is added until the mixture thickens and then rapidly cures into a solid clear resin.

EXAMPLE 3

Example 1 is modified wherein the urea and phosphoric acid is mixed and reacted to produce urea phosphate, then it is slowly mixed at ambient temperature and pressure with the formaldehyde thereby producing a urea-formaldehyde phosphate resin.

EXAMPLE 4

12 parts by weight of aqueous phosphoric acid (85%) is mixed with 60 parts by weight of aqueous formaldehyde (37%), then 16 parts by weight of urea powder is rapidly added and mixed thereby producing a urea-formaldehyde-phosphate white pre-polymer emulsion. After 10 days the pre-polymer was heated to 50–70 degree C. until the solution became clear, then the resin was poured into a mold and it solidified into a clear solid resin.

Dry soft wood sawdust was blended with 18% urea-formaldehyde-phosphate pre-polymer then compressed in a mold, then heated to 150 degrees C. while under pressure. The sawdust and pre-polymer was cured to form a flame retardant particle board.

Dry soft wood sawdust was blended with 15% urea-formaldehyde-phosphate pre-polymer then blended with 5% urea powder. The mixture was then compressed in a mold and heated to 150 degrees C. while under pressure. The sawdust, pre-polymer and urea was cured to form a flame retardant particle board.

EXAMPLE 5

12 parts by weight of diurea phosphate is slowly added to 30 parts by weight of aqueous formaldehyde containing 3 parts by weight of phosphoric acid at ambient temperature and pressure. The solution remained clear and the chemical reaction was exothermic. The solution began to thicken and was poured into a mold. The resin solidified into a semi-flexible, clear resin.

EXAMPLE 6

Example 1 is modified wherein 50% of the aqueous formaldehyde is replaced with another aldehyde selected from the list below. The resin is cured by heating up to 90 degrees C.

| | |
|---|---|
| a) acetoaldehyde | b) acetoaldehyde plus 50% paraformaldehyde |
| c) paraformaldehyde | d) butylaldehyde |
| e) furfural | f) acrolein aldehyde |

EXAMPLE 7

40 parts by weight of melamine is slowly added to 120 parts by weight of aqueous formaldehyde (37%) containing 20 parts by weight of phosphoric acid (85%) then the mixture is heated up to 75 degrees C. until the mixture thickens then solidifies into a solid resin.

EXAMPLE 8

60 parts by weight of melamine phosphate is slowly added to 120 parts by weight of aqueous formaldehyde (37%) containing 10 parts by weight of phosphoric acid (85%) then the mixture is heated to 70 degrees C. and the mixture begins to thicken. The mixture is poured into a mold then solidifies into a clear solid resin.

EXAMPLE 9

Example 7 is modified wherein another amino compound is used in place of melamine and selected from the group below:

| | |
|---|---|
| a) urea | b) dimelamine phosphate |
| c) melamine cyanurate | d) cyanoguanidine |
| e) 50% biuret with 50% urea | f) cyanuric acid |
| g) guanidine | h) cyamelide |
| i) dicyandiamide | j) partially hydrolyzed urea condensate |
| k) aminoguanidine | l) urea-melamine condensate, U:M 2:1 ratio |
| m) urea-polyol condensate U:P 4:1 ratio | n) urea-adipic acid condensate U:A 3:1 ratio |
| o) urea-boric acid condensate U:B 4:1 ratio | p) urea-ethylene diamine condensate U:E 4:1 |
| q) urea-propylene oxide condensate U:P 4:1 ratio | r) urea-sucrose condensate U:S 4:1 ratio |
| s) urea-lignin condensate U:L 4:1 ratio | t) urea-dicyandiamide condensate U:D 4:1 |

EXAMPLE 10

Example 1 is modified wherein 25% of the urea is replaced with a compound selected below then heated up to 75 degrees C. until the mixture solidifies into resinous mass.

| | |
|---|---|
| a) phenol | b) aniline |
| c) resorcinol | d) furfuryl alcohol |
| e) polyvinyl alcohol | f) cresol |
| g) polyvinyl acetate | h) triethylenediamine |
| i) aminophenol | j) epoxy resin |
| k) dimethyl methyl phosphonate | l) acrylic acid |
| m) cellulose | n) polyamide with free $NH_2$ radicals |
| o) lignin | p) ethylenediamine |
| q) polyisocyanate (MDI) | r) methacrylic acid |

EXAMPLE 11

Example 8 is modified wherein another aminophosphate is used in place of melamine phosphate and selected from the group below:

| | |
|---|---|
| a) diurea phosphate | b) biuret phosphate |
| c) cyanuric acid salt of phosphoric acid | d) guanidine phosphate |
| e) partially hydrolyzed urea condensate phosphate | f) cyanoguanidine phosphate |
| g) dicyanimide phosphate | h) aminoguanidine phosphate |

EXAMPLE 12

Example 4 is modified wherein a filler is added to the urea-formaldehyde pre-polymer in the amount of 30 parts by weight and selected from the list below:

| | |
|---|---|
| a) silica powder | b) ceramic powder |
| c) wood powder | d) phenoplast powder |

EXAMPLE 13

Urea and aqueous formaldehyde in the molar ratio of U:F of 0.5:1 are mixed then heated to 50–70 degree C. then 0.5 molar of phosphoric acid is added while agitating. The mixture solidifies into urea-formaldehyde-phosphate granules or powder.

One mole of formaldehyde was mixed with the above 2 moles powdered urea-formaldehyde-phosphate resin, then the pH was adjusted with ammonium hydroxide to a pH of 7-9, then 1.5 mole of urea is added and the mixture is heated to 50–80 degree C. or to reflux for 15 minutes to 1 hour. Water is removed under reduced pressure until a solid content of 60% is obtained.

About 10 parts by weight of the urea-formaldehyde-phosphate powder produced above, 0.5 parts by weight of boric acid, 0.25 parts by weight of zinc oxide are mixed with 30 parts by weight of epoxy resin and 10 parts by weight of a diamine curing agent. The epoxy resin solidified. After 1 week the epoxy resin was flame tested by hanging the cured resin vertically, then placing a 3" Bunsen burner flame under the resin for 10 minutes. The resin did not catch on fire. Other resin were used in place of the epoxy resin such as polyester resin and was also flame retarded.

Various meltable plastic such as polyester and polyvinyl acetate resins were melted and 25% by weight of the urea-formaldehyde-phosphate resinous powder produced in this example was mixed into the melted resin. These flame retarded resins were flame tested with a 3" Bunsen burner flame placed against the vertically place resins for 10 minutes and the resins did not catch on fire.

Douglas fir sawdust was blended with 18% by weight of the urea-formaldehyde-phosphate resin produced in this example then placed in a mold and compressed, then heated under pressure to 150 degrees C. The particle board was flame tested using a 4" Bunsen burner flame against the board place at a 45 degrees vertically. The particle board charred but did not catch on fire.

EXAMPLE 14

Example 13 is modified wherein 0.25 mole of an organic compound selected from the list below is added with the urea:

| | |
|---|---|
| a) phenol | b) cresol |
| c) polyamide With free $NH_2$— radicals | d) sucrose |
| e) aniline | f) corn syrup |
| g) propylene oxide | h) adipic acid |
| i) polyisocyanate | j) epoxy resin |
| k) polyvinyl alcohol | l) polyvinyl acetate |
| m) resorcinal | n) diethylamine |
| o) furfuryl alcohol | p) acrylic acid |
| q) dimethyl methyl phosphonate | r) dimethyl phosphite |
| s) fatty acids | t) phosphonate ester |
| u) sucrose amine polyol | v) melamine |
| w) dicyandiamide | x) urea borate |
| y) ammonium borate | z) lignin |

EXAMPLE 15

One molar weight of urea and one molar weight of phosphoric acid (75%) are mixed and placed into one of the compartments of a two component mixing machine, then two molar weight of formaldehyde, using aqueous formaldehyde, are placed in the other compartments. The two components are pumped thru a mixing element then sprayed on to a substrate such as steel sheet, wood, plywood, glass or aluminum sheet to form a layer of about 1/16". The urea-formaldehyde-phosphate resin forms a clear, tough, flexible resin layer on the substrate. After about 1 week the coated material was flame tested using a 3" Bunsen burner flame against the coated material for 10 minutes. The coated material charred, foamed, but did not burn.

EXAMPLE 16

Example 15 is modified wherein 0.25 molar weight of an organic compound selected from the list in example 14 is added with the urea

EXAMPLE 17

Example 15 is modified wherein 1 molar weight of a filler selected from the list below and added to the aqueous formaldehyde:

| | |
|---|---|
| a) silica powder | b) ceramic powder |
| c) wood powder | d) mica powder |
| e) aluminum phosphate powder | f) zinc borate |
| g) calcium sulfate | h) styrene resin powder |
| i) phenoplast powder | j) aminoplast powder |
| k) amino-aldehyde-phosphate powder | l) ethylene-vinyl acetate powder |
| m) clay | n) powdered coke |
| o) glass heads | p) melamine sulfate |
| q) ammonium sulfate powder | r) titanium oxide powder |
| s) zinc oxide powder | t) boron phosphate powder |
| u) dimelamine phosphate | v) biuret phosphate |
| w) cyanuric acid salt of phosphoric acid | x) melamine salt of dimethyl methyl phosphonate |
| y) lignin sulfonate | z) boron sulfate |

EXAMPLE 18

30 parts by weight of aqueous formaldehyde (37% formaldehyde) and 10 parts by weight of phosphoric acid (75%) are mixed then 12 parts by weight of urea-melamine condensate (U:M ratio of 2:1) is slowly added and mixed. The mixture is heated to 50–70 degrees C. for a few minutes until the solution becomes clear. The mixture is then poured into a mold to about 1/16" thick. The mixture slowly solidifies into a clear, flexible, resinous film. One week later the film was flame tested with a 3" Bunsen burner for 10 minutes. The film did not catch on fire but did form a bubbled char.

EXAMPLE 19

35 parts by weight of the urea-formaldehyde-phosphate powder produced in example 13 is mixed with 65 parts by weight of a urea-formaldehyde resin with a solid content of 65% and a F:U ratio of 1.41:1. This mixture was is blended with douglas sawdust in the amount of 15%, then compressed into a mold, then heated under pressure until a temperature of 145 degrees C. is obtained. The particle board was flame tested with a 4" Bunsen burner flame for 10 minutes and the particle board charred but did not catch on fire.

EXAMPLE 20

Example 19 is modified wherein dried soft wood core chips, along with a commercial wax emulsion, are used in place of saw dust.

EXAMPLE 21

1 mole of urea, 1.5 moles of acetoaldehyde and 1 mole of phosphoric acid is mixed at ambient pressure, then the mixture is heated to 70–90 degree C. for 15–60 minutes thereby producing an amino-aldehyde-phosphate resin.

EXAMPLE 22

Example 21 is modified wherein another aldehyde is utilized in place of acetoaldehyde and selected from the list below:

| | |
|---|---|
| a) acetoaldehyde | b) acetoaldehyde plus 50% paraformaldehyde |
| c) paraformaldehyde | d) butylaldehyde |
| e) furfural | f) acrolein aldehyde |

EXAMPLE 23

The urea-formaldehyde-phosphate resin produced in example 15 is sprayed, before it solidifies, onto the outer surface of a rigid polyurethane foam to produce a 1/16" layer on the outer surface. After 1 week the foam was flame tested by applying a 4" Bunsen burner to the surface of the coated rigid polyurethane foam for 10 minutes. The foam charred but did not catch on fire.

EXAMPLE 24

Example 23 is modified wherein the urea-formaldehyde-phosphate is sprayed onto the outer surface of a 1"×6"×12" douglas fir board. The flame retarded board was flame tested an in example 23 and did not catch on fire.

I claim:

1. The process for the production of amino-aldehyde-phosphate resin consisting of mixing, heating and reacting at ambient to elevated temperature, at ambient, elevated or reduced pressure, the following components:

A) amino compound, in an amount of 1–2 moles;

B) aldehyde, in an amount of 1–2 moles;

C) phosphorus oxyacid in an amount of 0.5 to 1 mole, wherein said phosphorus oxyacid is selected from the group consisting of phosphoric acid, polyphosphoric acid, pyrophosphoric acid, triphosphoric acid, metaphosphoric acid, hydrophosphoric acid, phosphinic acid, phosphinous acid, phosphate oxide, phosphate trihalides, phosphorus oxyhalides, phosphorous oxide, mono-metal dihydrogen phosphate, amino dihydrogen phosphate, amine dihydrogen phosphate, alkali metal dihydrogen phosphate, halogenated phosphate-phosphite and their halides and mixtures thereof, D) organic compound that will react with component B, in an amount of 0 to 100 percent, percentage based on weight of amino compound;

E) filler, in an amount of 0 to 200 percent, percentage based on the weight of amino compound;

F) water in an amount of 0 to 200 percent, percentage based on the weight of amino compound;

G) acid and/or basic compound, in an amount of 0 to 10 percent, percentage based on weight of the amino compound to adjust the pH;

component (A) and (C) are mixed and reacted to produce amino salt of phosphorous oxyacid then component (F) is added and mixed, then component (B) and (D) are added, mixed and reacted at ambient to 90 degrees C., and at ambient to reduced pressure, then component (E) is added, than component (G) is added to adjust the pH.

2. The process of claim 1 wherein the amino compound is urea, the aldehyde is aqueous formaldehyde and the phosphorus oxyacid is phosphoric acid.

3. The process of claim 1 wherein the phosphorous oxyacid is a mixture containing 50% phosphoric acid and 50% organic phosphorus oxyacid selected from the group consisting of organic phosphonate, phosphite, phosphate and phosphonate ester and acid.

4. The process of claim 1 wherein the amino compound is selected from the group consisting of urea, partially hydrolyzed urea condensate, buiret, cyanuric acid, cyamelide, melamine, melamine cyanurate, dicyandiamide, guanidine, cyanoguanidine, aminoguanidine, and mixtures thereof.

5. The process of claim 1 wherein the aldehyde is selected from the group consisting of formaldehyde, paraformaldehyde, acetoaldehyde, butyraldehyde, chloral, and other alkyl aldehydes, furfural, benzyl aldehyde acrolein aldehyde, and other aromatic aldehydes.

6. The process of claim 1 wherein the organic compound is selected from the group consisting of amines, polyamines, phenol, cresol, aminophenol, quinones, anline, Bisphenol A and resorcinol, vinyl acetate, polyvinyl alcohol, furfuryl alcohol, epoxy resins, polyepoxy compounds, polyamides, acetyl resins, acrylic acids, cellulose, carbohydrates, polyisocyanates, lignin, lignin sulfonate, lignin-cellulose, amines, alkylanolamines, polycarboxyl acid and anhydrides, epoxies, polyvinyl acetate, organic isocyanates, imides, amides, sulfamic acid, thiourea, epihalohydrin, thiophenol, ketones, alkyl carbonates, oils, fats, allyl alcohol, alkyl acrylic acids, polyester resins with free —OH or —COOH radicals, sucrose amine polyols, sucrose polyols and mixtures thereof.

7. The process of claim 1 wherein the filler is selected from the group consisting of aminoplasts, phenol-aldehyde resin powder, powdered coke, graphite, graphite compounds, plastic powder, silicates, ceramics, silica, metal oxides, silicates, carbonate, sulphates, phosphate and borates, glass or hollow beads, wood flour, straw fibers, nut shells, ammonium sulfates, amino sulfates, china clay, glass fibers and mixtures thereof.

* * * * *